W. KIMMEL.
Vegetable Cutters.
No. 151,884. Patented June 9, 1874.
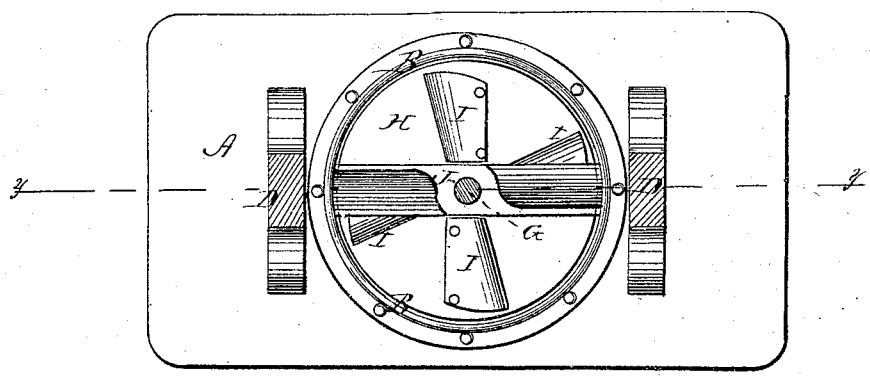
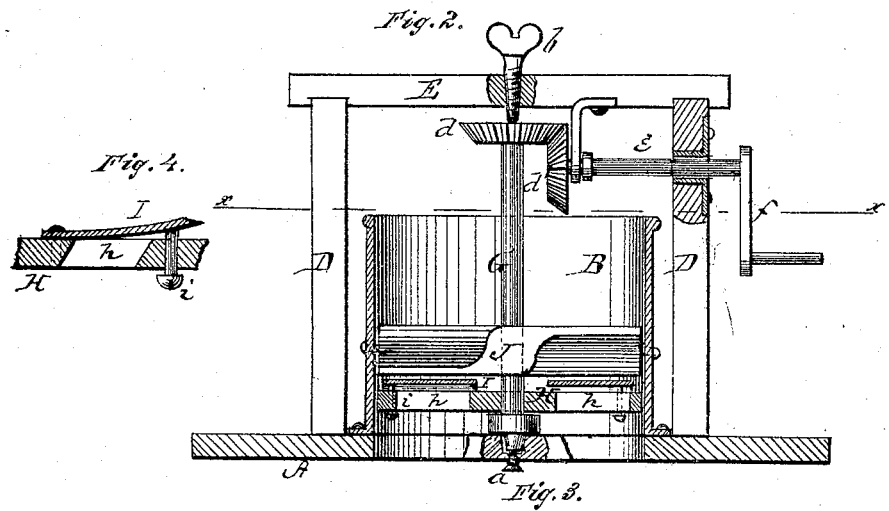
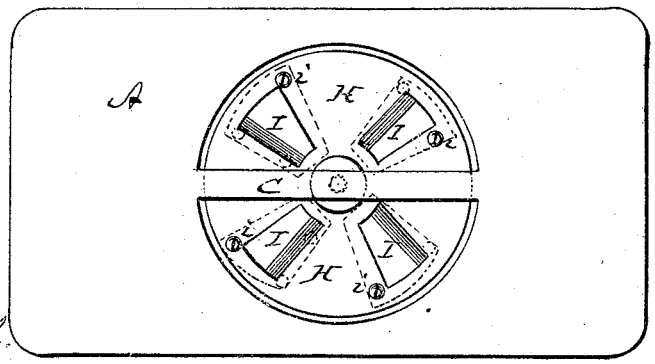

UNITED STATES PATENT OFFICE.

WILLIAM KIMMEL, OF SHENANDOAH, PENNSYLVANIA.

IMPROVEMENT IN VEGETABLE-CUTTERS.

Specification forming part of Letters Patent No. 151,884, dated June 9, 1874; application filed May 12, 1874.

*To all whom it may concern:*

Be it known that I, WILLIAM KIMMEL, of Shenandoah, in the county of Schuylkill and State of Pennsylvania, have invented certain new and useful Improvements in Vegetable-Cutters; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in the construction and arrangement of a vegetable-cutter for cutting and slicing cabbage, potatoes, and other vegetables for food for stock or other purposes, as will be hereinafter more fully set forth.

In the accompanying drawings, Figure 1 is a horizontal section of my machine through the line $x\ x$, Fig. 2. Fig. 2 is a horizontal section of the same through the line $y\ y$, Fig. 1. Fig. 3 is a bottom view of the machine, and Fig. 4 is an enlarged section through one of the cutters.

A represents the bed of the machine, in which is a circular opening corresponding with the size of the open-ended cylinder B secured on top of the bed A. Across the center of the opening in the bed A is left a cross-bar, C, as shown. D D are two standards on the bed A, the upper ends of which are connected by a cross-bar, E. Through the center of the cylinder B passes a vertical shaft, G, which turns upon pointed set-screws $a$ and $b$ in the bars C and E, respectively. This shaft is at its upper end provided with a miter-wheel, $d$, which gears with a similar wheel, $d'$, on the inner end of a horizontal shaft, $e$. This shaft has on its outer end a crank, $f$, by means of which it is turned, thereby revolving the vertical center-shaft G. On the shaft G near the lower end is secured a horizontal disk, H, of nearly the same diameter as the interior diameter of the cylinder B. The disk H is provided with four (more or less) radial openings, $h\ h$, made gradually increasing in width from the inner to the outer end, and over each opening on the upper side of the disk is secured a knife or cutter, I, the cutting-edge of which may be adjusted by means of a screw, $i$, to any desired height, so as to cut thinner or thicker slices as may be required.

The materials to be cut or sliced are held by means of a cross-bar, J, the sides of which are beveled, as shown, the bevels being so arranged with relation to the rotation of the cutters I upon the disk H, that, as said disk and cutters are rotated, the vegetables to be cut are forced down upon the cutters by the bevel of the cross-bar J. This cross-bar is fastened to the cylinder by pins, screws, or other suitable means at any desired height, and the central shaft G passes through the center thereof.

With this machine vegetables may be cut or sliced in any sized pieces desired, either for food for stock or for any other purpose for which it may be required.

Having thus fully described my invention, what I claim as new, and desire to secure by Letters Patent, is—

The beveled cross-bar J, arranged within and attached to the cylinder B, in combination with the revolving disk H, provided with the adjustable cutters I I, substantially as and for the purposes herein set forth.

In testimony that I claim the foregoing as my own I affix my signature in presence of two witnesses.

WILLIAM KIMMEL.

Witnesses:
 JOSEPH MARSHALL,
 JOSIAH W. JOHNSON.